United States Patent [19]

Desserre

[11] Patent Number: 4,771,350

[45] Date of Patent: Sep. 13, 1988

[54] MAGNETIC READING/WRITING TRANSDUCER FOR PERPENDICULAR RECORDING

[75] Inventor: Jacques Desserre, Rambouillet, France

[73] Assignee: Bull S.A. (Societe Anonyme), Paris, France

[21] Appl. No.: 813,236

[22] Filed: Dec. 24, 1985

[30] Foreign Application Priority Data

Dec. 28, 1984 [FR] France .................................. 84 20025

[51] Int. Cl.$^4$ .......................... G11B 5/17; G11B 5/147
[52] U.S. Cl. ..................................... 360/123; 360/126
[58] Field of Search ................................. 360/123, 126

[56] References Cited

U.S. PATENT DOCUMENTS

| | | | |
|---|---|---|---|
| 2,927,163 | 3/1960 | Brower | 179/100.2 |
| 3,564,522 | 2/1971 | Stevens | 360/123 X |
| 4,414,554 | 11/1983 | Springer | 360/123 X |

FOREIGN PATENT DOCUMENTS

| | | | |
|---|---|---|---|
| 31216 | 7/1981 | European Pat. Off. | |
| 55-4734 | 1/1980 | Japan | 360/123 |
| 56-145512 | 11/1981 | Japan | 360/123 |

OTHER PUBLICATIONS

Patent Abstracts of Japan, vol. 4, No. 138, Sep. 27, 1981, (Fujitsu 55-87324).

*Primary Examiner*—A. J. Heinz
*Attorney, Agent, or Firm*—Kerkam, Stowell, Kondracki & Clarke

[57] ABSTRACT

A magnetic transducer for writing and reading data on a perpendicular recording carrier such as a magnetic disk includes a writing pole ($MPOLI_1$) perpendicular to the recording carrier and a coil ($BOBI_1$) magnetically coupled to a writing pole, each turn cross section of the coil being perpendicular to the carrier. The coil comprises a spiral with a flat development parallel to the carrier, disposed about and in the vicinity of the end of the writing pole ($MPOLI_1$) that is located facing the carrier.

21 Claims, 9 Drawing Sheets

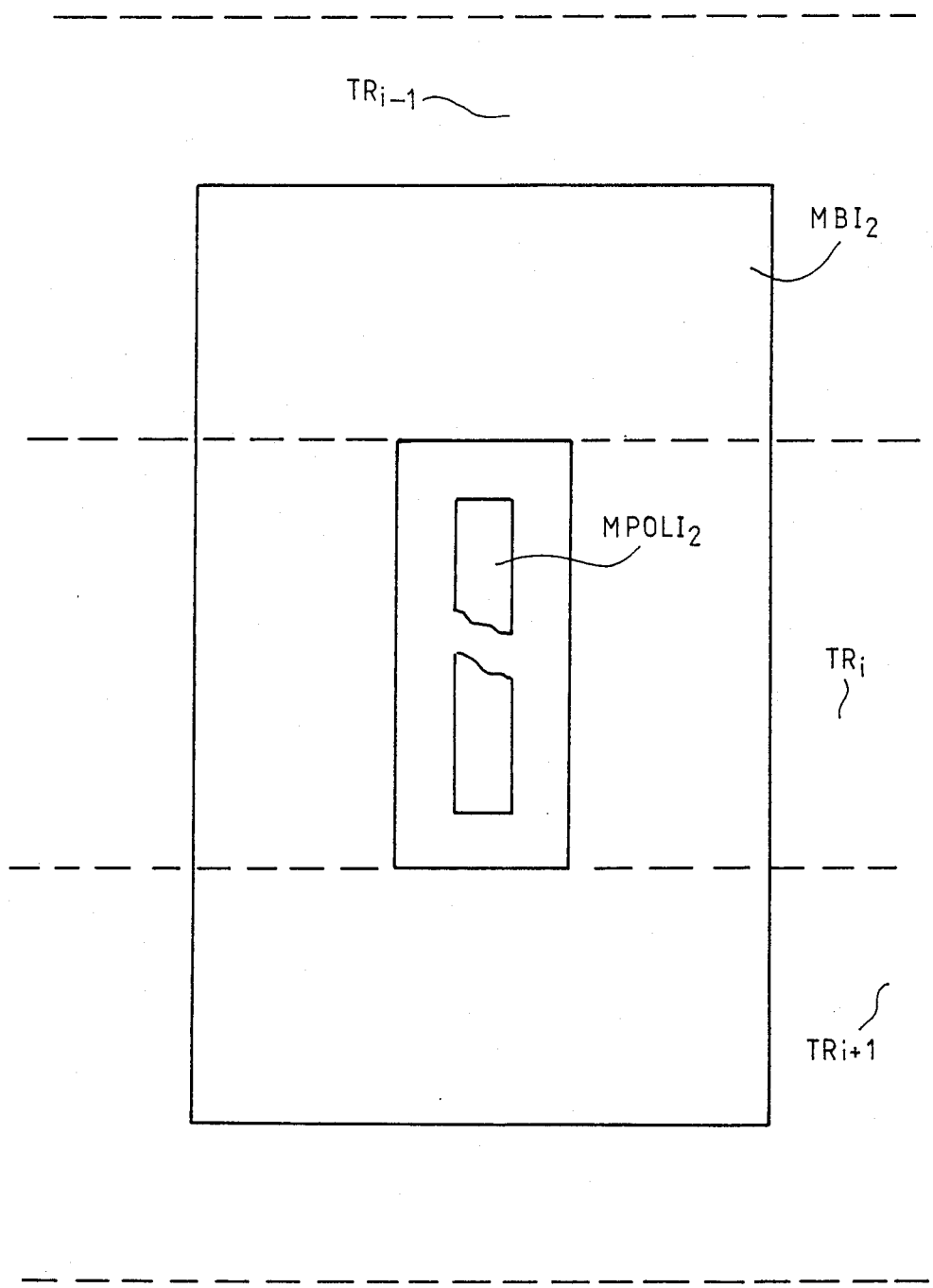

MAGNETIC READING/WRITING TRANSDUCER FOR PERPENDICULAR RECORDING

FIELD OF THE INVENTION

The present invention relates to a magnetic writing transducer for transverse recording. It is applicable in particular to high density linear and radial recording of data onto the magnetic disks of disk memories.

BACKGROUND OF THE INVENTION

It is known that the data carried by magnetic disks are contained inside concentric circular tracks. They take the form of a succession of small magnetic cells, known as elementary cells, distributed over the entire length of each track. The magnetization in two consecutive elementary magnetic cells is in opposite directions and generally has the same modulus.

The means which enables data to be either written on the magnetic disks or read therefrom, or which enables both of these functions to be realized, is known as a transducer.

The trend in present-day development of magnetic disks is to seek ways of attaining radial densities of several thousand tracks per centimeter (measured along the diameter of the disks), and linear densities equal to or greater than 10,000 changes in magnetization direction per centimeter (measured along the circumference of the tracks).

A preferred method of writing data that enables such recording densities to be attained is known as perpendicular writing. In this method, the magnetization in the elementary cells is located perpendicular to the magnetic recording film of the disk. In this method, the magnetic medium comprising the film is an anisotropic magnetic medium having one preferred direction of magnetization, known as the direction of easy magnetization, perpendicular to the recording film.

To obtain very high linear and radial density of data, integrated or thin-film magnetic transducers are preferably used, the magnetic circuit of which include a main writing pole, which is magnetically excited by a coil, and an auxiliary pole.

Various types of integrated transducers including a main writing pole are known.

When the auxiliary pole and the main pole of the magnetic circuit are located on the same side with respect to the recording carrier, the magnetic transducer is known as the shoe type. An integrated transducer of this type is described in French Pat. No. 2.428.886, invented by Jean-Pierre Lazzari and filed June 13, 1978 by the Compagnie Internationale pour l'Informatique CII Honeywell Bull under the title "Support d'informations magnetiques a enregistrement perpendiculaire" ["Magnetic Data Carrier for Perpendicular Recording"]. The carrier travels past the transducer perpendicular to the plane of the thin magnetic films forming the pole pieces. Preferably, if the dimension of the poles measured parallel to the direction of travel defines the thickness of the pole pieces, then the thickness of the auxiliary pole is much greater than the thickness of the main writing pole (generally by a factor of more than 5), so that the cross section of the auxiliary pole is much greater than that of the writing pole.

The main writing pole is made of soft magnetic material, preferably anisotropic. In that case, the axis of difficult magnetization is perpendicular to the recording carrier. Writing data on the carrier is therefore performed by causing the carrier to travel therepast at a constant speed and sending a variable current, characteristic of the data to be written, through the coil associated with the writing pole. The magnetic field thus produced modifies the magnetic equilibrium of the pole pieces. With respect to the main pole, thre is a concentration of magnetic flux; the profile of the field is a function of the permeability of the pole and of its very slight thickness. The axis of easy magnetization of the magnetic recording film is perpendicular to the surface of it. The magnetic field component that is perpendicular to this surface is sufficiently intense that it can cause the reversal of the magnetization in this direction. With respect to the auxiliary pole, in contrast, the magnetic field and its component perpendicular to the surface of the film are of much lesser intensity than the same component with respect to the main writing pole. (In an initial approximation, the intensity of the fields produced in the vicinity of the poles varies in an inverse ratio to their cross sections, the magnetic flux being conservative.) Thus the magnetic state of the film at the level of the auxiliary pole is not modified. Only the main pole thus takes part in the writing process.

When the main pole and the auxiliary pole are disposed on opposite sides of the recording carrier, this is known as a monopole type of transducer, as defined by Professor Iwasaki in the journal *IEEE Transactions on Magnetics*, Vol. MAG.13, No. 5, September 1977, pages 272–277. In this case, the magnetic flux created by the main writing pole traverses the recording carrier and crosses to the auxiliary pole disposed on the other side of this carrier.

There are various versions of monopole transducer which do not include the auxiliary return-flux pole. Such transducers are described, for example, in European patent applications Nos. 82.304048.0, filed on July 30, 1982 by Fujitsu Limited under the title "A Perpendicular Magnetic Recording and Reproducing Head", and 83.401480.5 filed on July 19, 1983 by the American company, Vertimag Systems Corporation, under the title "Read-write Head with a Planar Coil or Coils".

Transducers of the shoe type and the monopole type function analogously to one another, and there is a trend at present to call such transducers either main-pole transducers or single pole transducers or heads.

Although the monopole transducers, in writing, are well suited to high density recording of data, since the length of the elementary magnetic cells that are recorded is substantially less than or equal to the thickness of the main writing pole, the same is not true for reading, where the signal-to-noise ratio of such transducers is relatively low. This is due to three essential phenomena:

(1) the fact that the coil associated with the main writing pole is disposed in a plane that is perpendicular to the recording carrier and to the direction of travel of the data;

(2) the very high density of the data recorded on the carrier and read by the transducer; and (3) the distance between the carrier and the end of the writing pole that faces it.

In fact it has been found that the greater the density of the data, the more the intensity of the magnetic field created by the elementary magnetic cells of the carrier in the vicinity of the data decreases rapidly when the distance with respect to the surface of the carrier increases.

This is due to the strong magnetic coupling between the neighboring magnetic cells which result in the presence of a strong gradient of the field in the vicinity of the surface of the carrier.

Under these conditions, it is noted that the magnetic flux $\Phi i$ entering the main pole includes a useful portion $\Phi u$, produced by the data one seeks to read, and a non-useful portion (noise producer) $\Phi e$. This latter is due to the flux produced by the cells located on the same track adjacent to the cell facing which the pole is located, to the flux produced by the cells of tracks adjacent to the cell where the data being read are located, and to the flux produced by parasitic magnetic fields existing especially outside the recording carrier.

Under these conditions, the following facts are also observed experimentally by computer simulation. When the main pole is in a situation for picking up maximum flux $\Phi i$ (for example, when facing an elementary cell), the useful magnetic flux flows through it over only a very small height (a distance of all points of the pole with respect to the end of the pole disposed facing the carrier, this end being in turn located 2 to 3 tenths of a micron from the support), while contrarily it is subjected to the non-useful flux $\Phi e$ over a much greater height. This is a not inconsiderable cause of noise: a main pole on the order of 10 microns in height, for instance, is traversed by the useful flux over a height of only 1 to 3 microns.

Thus it will be appreciated that a coil disposed perpendicular to the support will pick up the useful flux over only a very small portion of its height, but contrarily will pick up the non-useful flux, created by the magnetic cells adjacent to those producing the useful magnetic flux, over a large portion of its height. As a result, single pole magnetic transducers as they are presently known are of little use for reading.

OBJECT AND SUMMARY OF THE INVENTION

The present invention makes it possible to overcome these disadvantages by disposing the coil in the immediate vicinity of the end of the monopole, such that each coil turn perpendicular to the carrier picks up the maximum useful flux $\Phi u$ and the minimum parasitic flux $\Phi e$, the number of coil turns being very high per unit of volume. Thus a very compact coil is obtained, which is disposed about and in the immediate vicinity of the end of the monopole.

Thus the geometric disposition of the coil with respect to the pole enables an extremely strong magnetic coupling between the magnetic pole and the coil. Furthermore, because of its low height the magnetic coil disposed in this way collects the greatest part of the useful flux $\Phi u$ entering the monopole, and a relatively slight portion of the parasitic flux $\Phi e$.

Thus a magnetic transducer of the monopole type is attained, the signal-to-noise ratio of which, in reading, is relatively more elevated than in the transducers of this same type known in the prior art.

According to the invention, the magnetic transducer for writing and reading data on a perpendicular recording carrier includes:

a writing pole of high-permeability magnetic material, perpendicular to the recording carrier, and a coil magnetically coupled to the writing pole, each tower section of which is perpendicular to the recording carrier, and is characterized in that in order to increase the signal-to-noise ratio, the coil comprises a spiral of flat development parallel to the carrier disposed about and in the vicinity of the end of the pole disposed facing the carrier.

Further characteristics and advantages of the present invention will become apparent from the ensuing description, given solely by way of illustrative and non-limiting example, taken in conjunction with the drawings.

BRIEF DESCRIPTION OF THE DRAWINGS

FIG. 3, comprising

FIG. 8 is a plan view, seen from the recording carrier, of the transducer of FIG. 7;

DESCRIPTION OF THE PREFERRED EMBODIMENTS

To better understand how the magnetic reading and writing transducer according to the invention is constituted and functions, it will be useful to be reminded of the constitution and function of magnetic reading and writing transducers of the monopole type according to the prior art, and of their disadvantages, particularly in reading. These reminders will be illustrated by FIGS. 1 and 2, showing the two different types of monopole transducers, and FIG. 3, showing the disadvantages of such transducers for reading.

Figure 1:
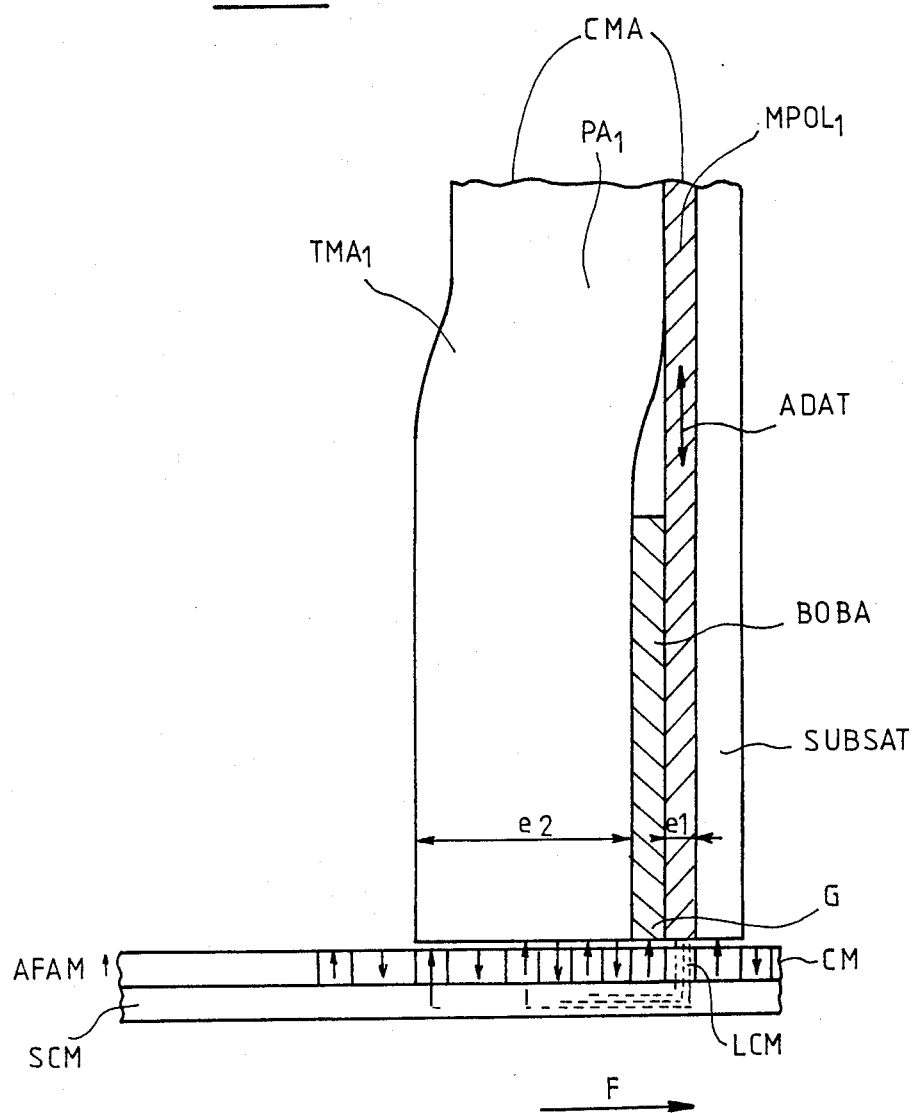
FIG. 1 is a simplified illustration as a reminder of how a shoe-type integrated transducer is constructed.
Figure 2:
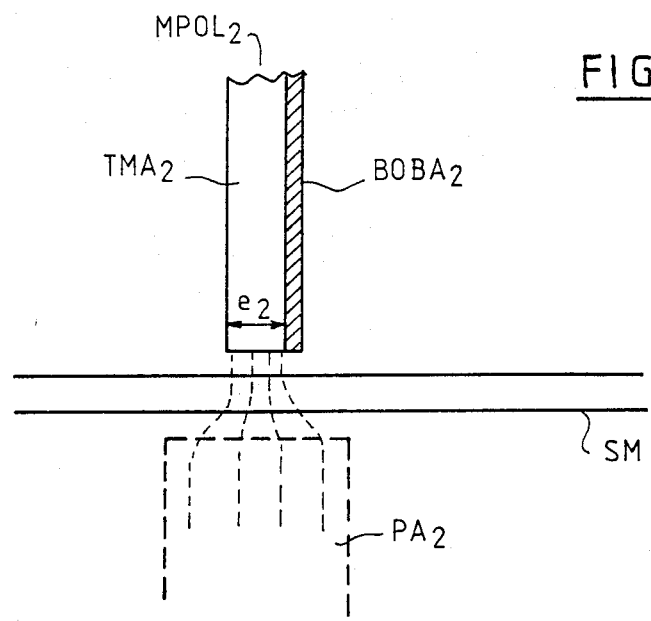
FIG. 2 is a simplified illustration of the principle of a monopole type of transducer.

FIG. 1 shows a magnetic transducer of the shoe type, $TMA_1$.

This transducer $TMA_1$ includes:

the main pole $MPOL_1$;

the auxiliary pole $PA_1$;

the coil BOBA, the plane of which is perpendicular to the recording carrier SM.

The main pole $MPOL_1$ and the auxiliary pole $PA_1$ are disposed on the same side of the data carrier SM and in its vicinity they have an air gap G, the longer dimension of which is perpendicular to the direction of travel F of the data and to the plane of the drawing. Each of the two poles, which comprise the magnetic circuit CMA of the transducer $TMA_1$, is formed for example of a plurality of thin magnetic films, separated from one another by thin insulating films; these various films are not shown in FIG. 1, for the sake of simplification. The main pole $MPOL_1$ is disposed on a magnetic substrate SUBSAT. The coil BOBA may be embodied in two different forms. The first form comprises a stack of a succession of thin conductive and insulating films in alternation and superimposed on one another, while the second form comprises a flat spiral, embodied for example in a single thin conductive film disposed on a plane that is perpendicular to the plane of flight. The thickness $e_1$ of the main pole $MPOL_1$ (the dimension measured in a direction parallel to the direction of data travel F) is much less than the thickness $e_2$ of the auxiliary pole $PA_1$.

Very often, the poles are made of anisotropic magnetic material. The axis of difficult magnetization is the axis ADAT that is normal to the plane of the magnetic recording carrier SM. The axis of easy magnetization, not shown in FIG. 1, is perpendicular to the plane of the drawing and to the direction of data travel.

The recording carrier SM comprises a film CM of anisotropic magnetic material disposed on a magnetic underlayer SCM. The axis of easy magnetization of this magnetic matrial CM is perpendicular to the surface of the recording carrier and is indicated by the symbol AFAM.

To write the data onto the carrier SM that travels in the direction of the arrow F at a constant speed, a current characteristic of the data to be written, formed of a train of positive and negative square signals of variable duration, is supplied to the coil. The magnetic field traveling across the poles that is created by the passage of current through the coil has a major component in the direction of difficult magnetization ADAT, and the resultant magnetic flux closes across the magnetic film SM and the underlayer SCM in the manner indicated by the lines of flux LCM in FIG. 1. Facing the main pole $MPOL_1$, the magnetic field has a component that is perpendicular to the recording carrier SM, which has a much greater intensity than the same component facing the auxiliary pole $PA_1$, because of the difference between the two thicknesses $e_1$ and $e_2$, and accordingly between the cross sections of the main pole and auxiliary pole (see above).

Thus it will be appreciated that the main pole $MPOL_1$ creates the data on the carrier SM without the writing of these data being disturbed by the presence of the auxiliary pole $PA_1$, which may or may not experience these data traveling past it, in the slected direction of travel of the support.

Turning now to FIG. 2, a transducer $TMA_2$ of the monopole type, such as that described in the above-mentioned article and in the above-mentioned European patent applications Nos. 82.304048.0 and 83.401480.5, is shown.

This transducer $TMA_2$ comprises:
the monopole $MPOL_2$; and
the coil $BOBA_2$, the plane of which is perpendicular to the recording carrier SM.

The transducer $TMA_2$ may or may not include an auxiliary pole $PA_2$ disposed such that the latter and the monopole $MPOL_2$ are placed on either side of the recording carrier SM, analogous to what is shown in FIG. 1.

The coil $BOBA_2$ may be embodied in the same manner as the coil $BOBA_1$ of the transducer $TMA_1$. When functioning in the writing mode, when a current circulates within the coil $BOBA_2$ the monopole $MPOL_2$ is traversed by a magnetic flux, some lines of which have been shown in dashed lines in FIG. 2. This magnetic flux closes at infinity. Conversely, in the reading mode the stray magnetic field created by the various recorded cells on a magnetic track of the carrier SM creates a magnetic flux the travels via the pole $MPOL_2$ and induces an electromotive induction force at the terminals of the coil $BOBA_2$.

Figure 3A:
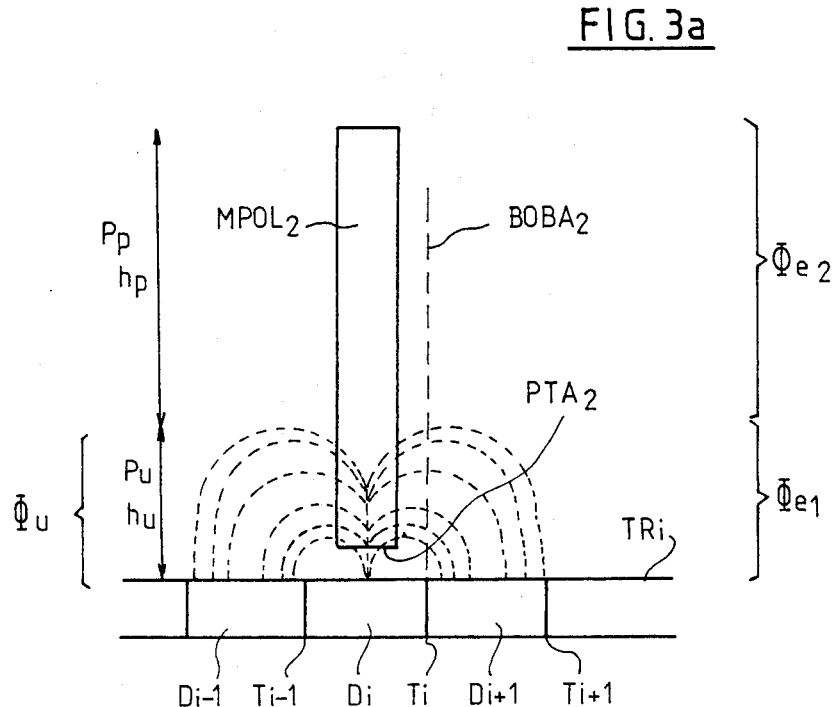
FIGS. 3a, 3B and 3c, illustrates the disadvantages of a monopole type of transducer for reading.
Figure 3C:
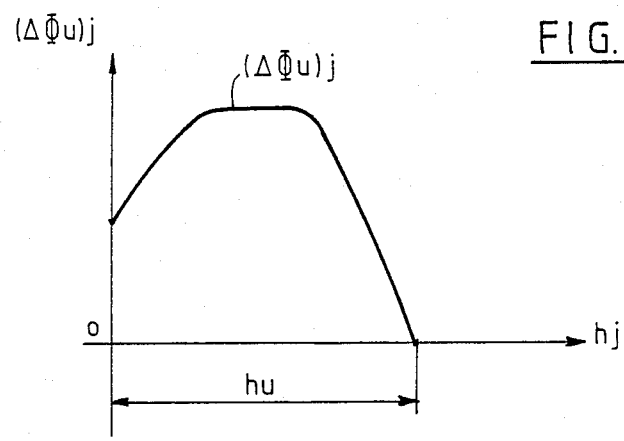
Figure 3B:
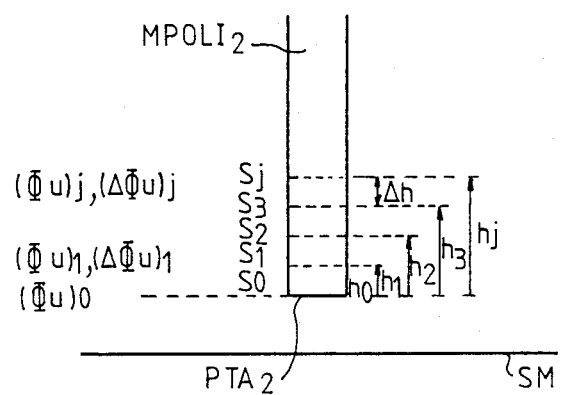

FIGS. 3a and 3b will now be described, which show the disadvantage of a monopole type of transducer for reading.

By way of example the magnetic carrier SM has a highly elevated recording density, on the order of 10,000 changes of direction of magnetization per centimeter. In this figure, a certain number of these changes in the magnetization direction, or magnetic transitions, have been shown, that is, the transitions $T_{i-1}$, $T_i$ and $T_{i+1}$. The transition $T_i$ is disposed between the two magnetic cells $D_i$ and $D_{i+1}$, the transition $T_{i+1}$ between the two cells $D_{i-1}$ and $D_{i+1}$, etc. In this same FIG. 3, the lines of magnetic flux generated by the stray magnetic fields of the cell $D_i$ are shown, entering the monopole $MPOL_2$ (which could equally well be the monopole $MPOL_1$; the physical phenomena that are produced will be the same). These lines of flux have been observed by computer simulation methods, for instance. It has been supposed that the thickness $e_2$ of the monopole $MPOL_2$ is on the order of a micron, and the dimensions of the magnetic cells $D_i$, $D_{i+1}$, etc. recorded on the carrier SM are likewise on the order of a micron.

In this case, it will be undertood that the majority of the magnetic lines of flux leaving the cell $D_1$ toward cells $D_{i-1}$ and $D_{i+1}$ is channelized by the pole piece $MPOL_2$ over a height $h_u$ which is very slight with respect to the total height of the monopole $MPOL_2$. It has been possible to observe by simulation that this height $h_u$ has been between 1 and 3 microns; in other words, this is the order of magnitude of the thickness of the pole and of the dimension of the various magnetic cells $D_i$. These lines of force picked up by the monopole $MPOL_2$ over a height $h_u$ comprise the useful flux $\Phi u$, which generates a useful signal $S_u$ that is picked up at the terminals of the coil $BOBA_2$.

Contrarily, it has been possible to observe that the greatest part $\Phi e_2$ of the magnetic flux $\Phi e$ which is produced essentially by the cells surrounding the cell $D_i$ (hence $D_{i-1}$ and $D_{i+1}$) on the same track $TR_i$, on the one hand, and on the other hand by the cells located on the adjacent tracks of $TR_i$, penetrates to the interior of the monopole $MPOL_2$ in the upper portion thereof, over a height $h_p$, beginning at a height $h_u$ ($h_u$ is measured beginning at the end $PTA_2$ of the monopole). A lesser part $\Phi e_1$ of this flux $\Phi e$ penetrates the monopole $MPOL_2$ over the lower part of the height $h_u$ of the monopole. It will be remembered that this flux $\Phi e$ generates the noise signal B, that $\Phi e_1$ produces a noise signal $B_1$ and that $\Phi e_2$ produces a noise signal $B_2$, with $B_2$ generally being greater than $B_1$.

The monopole $MPOL_2$ can thus be divided into two parts: a useful part $P_u$ having a height hu, which serves to collect the magnetic flux that generates the useful signal $S_u$ (and which also collects $\Phi e_1$), and a non-useful part, that is, the part $P_p$ having a height $h_p$, which contributes to the production of the greatest part of the noise signal B, that is, $B_2$.

Let it be assumed that there is a succession of cross sections $S_0, S_1, \ldots, S_j$ of the writing pole that are parallel to the support and located at distances (also known as heights) $h_0, h_1, \ldots, h_j$ from the end of the pole $PTA_2$ disposed facing the carrier (two- or three-tenths of a micron from it), with $h_1-h_0=h_2-h_1=h_3-h_2=\Delta h$, where $h_0=0$. The term $(\Phi u)_0$ represents the useful magnetic flux $\Phi u$ entering the pole at the level of its end, that is, where $h_0=0$, and $(\Phi u)_j$ is the useful flux entering the pole between the heights $h_0$ and $h_j$, where $(\Delta \Phi u)_j$ is the increase in useful flux between the heights $h_{j-i}$ and $h_j$, that is, such that $$(\Phi u)_j = (\Phi u)_{j-1} + (\Delta \Phi u)_j.$$

and hence $$(\Phi u)_j = (\Phi u)_0 + \sum_1^j (\Delta \Phi u)_j$$

If $(\Delta \Phi u)_j$ is measured between $h_{j-i}$ and $h_j$ for each value of $h_{j-1}$ and $h_j$, and if the variations of $(\Delta \Phi u)_j$ are plotted as a function of $h_j$, the curve of FIG. 3c is obtained. Beginning at the height $h_j = h_u$, $(\Delta \Phi u)_j$ is zero.

In comparing FIGS. 3a and 3C, it is apparent that the disadvantage of the reading transistor of the monopole type is as follows: First, a large part of the monopole $MPOL_2$ is not useful, and it contributes to obtaining a large noise signal, and second, a flat coil, disposed in a plane that is perpendicular to the direction of data travel, will not collect the useful flux except in a slight portion of its height, over a reduced number of turns, while all the turns of the flat coil will collect the non-useful flux and will generate a large noise signal.

Figure 4:
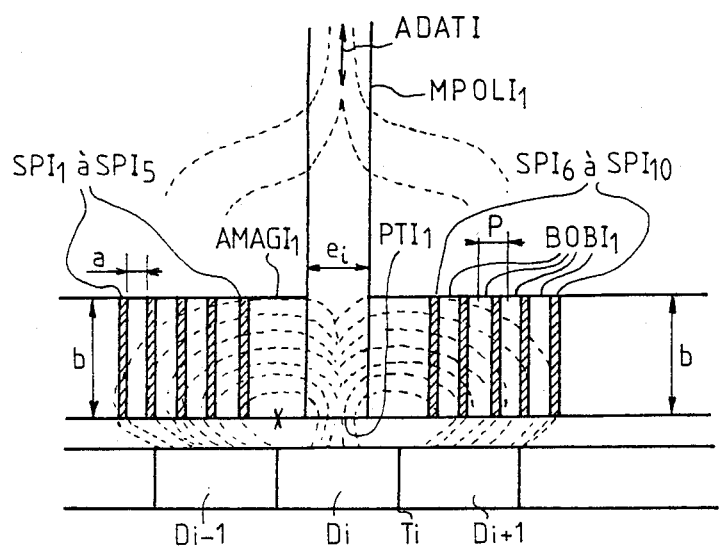
FIGS. 4, 5 and 6 show a first exemplary embodiment of an integrated monopole type of transducer according to the invention, FIG. 4 being a sectional view taken at the level of the coil, in a plane that is perpendicular to the carrier and parallel to the direction of travel of the data, FIG. 5 being a three-quarters perspective view showing the transducer according to the invention disposed facing three tracks of the recording carrier, and FIG. 6 being a plan view of the coil of the transducer according to the invention.
Figure 5:
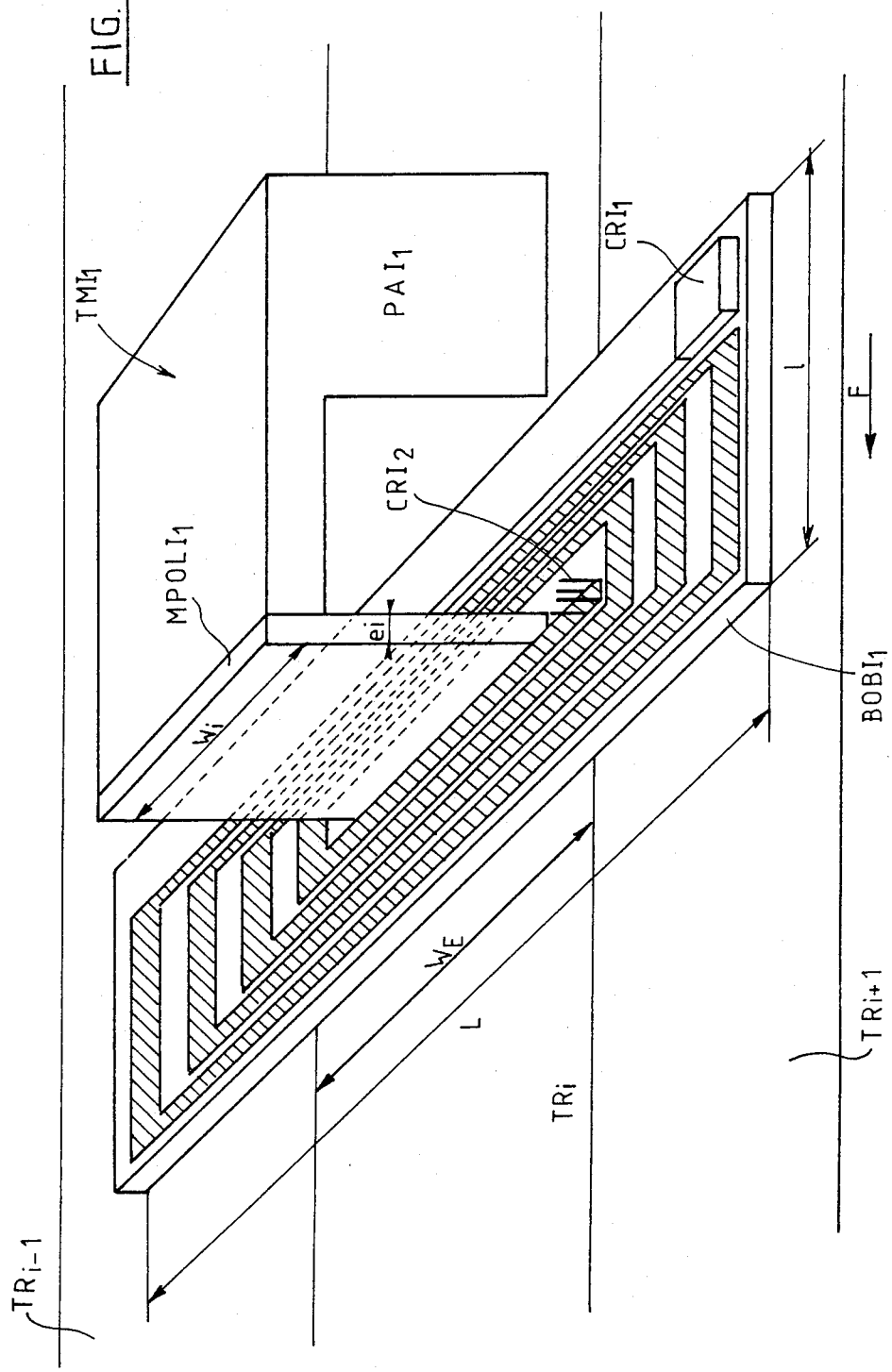
Figure 6:
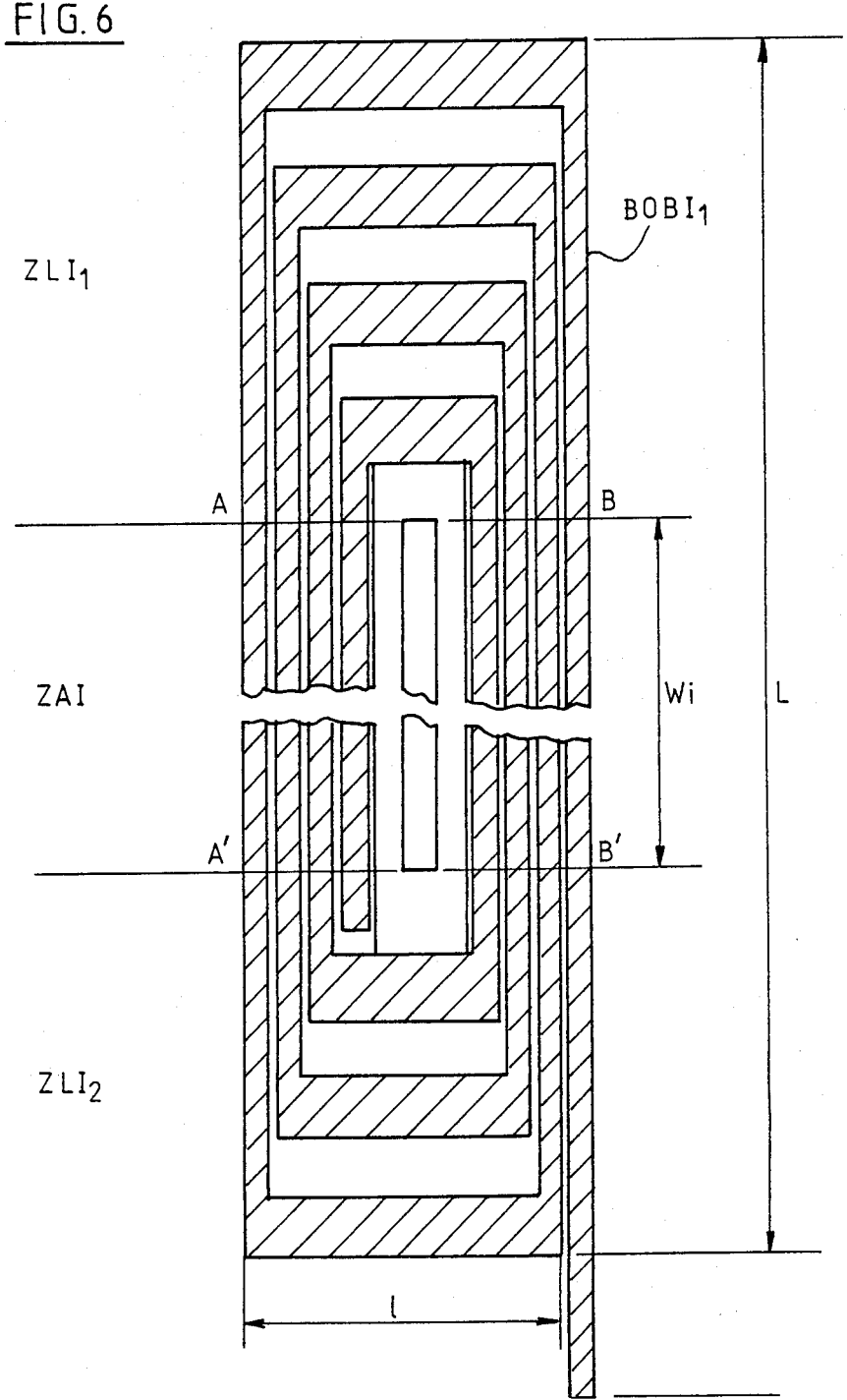

The transducer according to the invention, shown in FIGS. 4, 5, 6, overcomes the above disadvantages by disposing the coil in the immediate vicinity of the end of the monopole and around it; the height of the coil is equal to or less than the height $h_u$. In this way the useful signal $S_u$ is increased and the noise signal B is decreased, and the signal-to-noise ratio $S_u/B$ is increased.

The transducer $TMI_1$ of the monopole type according to the invention includes the following different elements:
 the monopole or main pole $MPOLI_1$, having an axis of difficult magnetization ADATI that is perpendicular to the recording carrier SM, this recording carrier being similar to the carrier shown in FIGS. 1-3; and
 the coil $BOBI_1$, which is a spiral having a flat development parallel to the support, the height b of which is equal to or less than the useful height $h_u$, and the density of turns per unit of length (per micron), measured parallel to the direction of travel of the carrier, is extremely high.

The transducer $TMI_1$ includes an auxiliary pole $PAI_1$, made of ferrite, for example, but clearly the invention is equally applicable to any transducer of the monopole type, whether it includes auxiliary poles made of other magnetic materials than ferrite or made of thin films, or does not include any auxiliary pole at all.

The coil $BOBI_1$ includes four turns. Looking at the cross section of each turn, in a given plane perpendicular to the recording carrier and parallel to the direction of travel (which is the sectional plane of FIG. 4), a represents the width of this cross section, measured in the direction of travel, and b represents its height measured perpendicular to the carrier, while c is the distance between the plane that is parallel to the carrier and includes the end $PTI_1$ of the monopole and the lower portion of each turn of the coil (that is, the portion that faces the carrier).

Preferably the lower end of each turn of the coil is contained in the parallel plane; that is, $c \simeq 0$.

The height b is such that the ratio between the useful flux $\Phi uc$ and the non-useful flux $\Phi ec$ intercepted by all the turns of the coil is as large as possible, such that the ratio $S_u/B$ will be optimum.

Generally, b is equal to or slightly less than $h_u$.

Now $a/b < 1$. Thus b may be on the order of 1 to 2 microns, and a may be on the order of 3 to 7000 angströms.

Given the extremely small dimensions of the cross section of each turn, and that the cross section is higher than it is wide ($a/b<1$), it will be understood that each cross section can be accommodated on a straight segment perpendicular to the recording carrier. By extension, it can be said that each cross section is perpendicular to the carrier, and that each turn is perpendicular to the carrier.

The symbol p indicates the pitch between the runs of the coil (that is, the distance between the axes of symmetry of the turn cross sections) (see FIG. 4). This distance is on the order of a micron.

In the exemplary embodiment shown in FIGS. 4–6, the number of turns per micron is thus on the order of 1, which is an increased density of turns per unit of length, for a transducer having dimensions on the order of those indicated above.

The coil $BOBI_1$ has a structure and dimensions such that it is very compact and is concentrated about and in the vicinity of the end $PTI_1$ of the monopole, which enables the following:
 first, to improve the magnetic coupling between the monopole $MPOLI_1$ and the coil, and
 second, to concentrate the maximum possible number of turns about the monopole, facing a given cell $D_i$ of the carrier, which makes it possible to pick up an increased useful flux originating at the monopole $MPOLI_1$, and to have a useful signal of increased amplitude.

These above two factors, combined with a height b such that $\Phi uc/\Phi ec$ is at a maximum, mean that the transducer according to the invention makes it possible, with a minimum of volume, to have the best possible ratio of $S_u/B$, with the amplitude of the signal $S_u$ correspondingly increased.

The symbol $W_i$ represents the width of the monopole $MPOLI_1$, measured perpendicular to the direction of data travel F (see FIG. 5).

Thus as FIG. 5 also shows, the transducer $TMI_1$ is shown disposed above the track $TR_i$ of the recording carrier SM. Since the data written on each track of the carrier SM are recorded by a transducer analogous to the transducer $TMI_1$, the result is that the width $W_i$ of the monopole $MPOLI_1$ is substantially equal to the width of each track $TR_i$ of the carrier SM; this latter width is indicated by $W_E$.

For obvious manufacturing reasons, the length L of the coil $BOBI_1$, measured perpendicular to the direction of data travel, is greater than the width $W_E$ of the track. Likewise, the length l measured parallel to the direction of data travel is greater than the thickness $e_i$ of the monopole $MPOLI_1$ (see FIGS. 5 and 6).

As a result, a portion of the coil $BOBI_1$ covers a portion of the tracks $TR_{i+1}$ and $TR_{i-1}$ adjacent to the track $TR_i$ which has the monopole $MPOLI_1$ facing it, when the transducer $TMI_1$ performs the operations of reading the track $TR_i$.

Thus the coil $BOBI_1$ can be broken down into three parts, that is, a central part called the active zone ZAI of the coil, which produces the useful reading signal $S_u$, and two lateral parts $ZLI_1$ and $ZLI_2$, which more particularly produce a portion of the noise signal, that is, the portion deriving from the tracks $TR_{i+1}$ and $TR_{i-1}$ adjacent to the track $TR_i$ which the transducer $TMI_1$ is in the process of reading.

To still further improve the ratio $S_u/B$ by reducing the noise signal B, different portions of the coil, that is, the central portion ZAI and the two lateral portions $ZLI_1$ and $ZLI_2$, have been provided with different structures.

The central portion ZAI is the one the cross section of each turn of which has been described above, and thus it includes a very high number of turns per unit of length, on the order of one turn per micron. The surface area of its cross section is slight.

Conversely, in the lateral portions $ZLI_1$ and $ZLI_2$ the number of turns per unit of length is much lower than in the central portion ZAI, and furthermore the cross section of each of the turns of the coil here is larger than in the central portion and so the coil is less efficient, and the noise signal B that is produced by the lateral portions $ZLI_1$ and $ZLI_2$ is limited, the more so because these portions only partially cover the adjacent tracks $TR_{i-1}$ and $TR_{i+1}$.

The coil $BOBI_1$ includes input and output terminals for current that are intended for conection to reading (and writing) circuits of the disk memory that includes the transducer $TMI_1$; these are the terminals $CRI_1$ and $CRI_2$, one of them ($CRI_2$) being disposed at the inside central end of the coil, that is, at the beginning of the first turn (the turns are counted beginning at the monopole $MPOLI_1$), and the other being disposed at the outer end of hte last turn of the coil (to the right of the track $TR_{i+1}$ as seen in FIG. 5).

Since the total height of the monopole $MPOLI_1$ is 5 to 10 microns and the height b of the coil is 1 to 2 microns, it will be appreciated that the coil is relatively flat in comparison with the overall dimensions of the transducer $TMI_1$. Thus this coil can be conceived of as a spiral arranged about the end $PTI_1$ of the monopole $MPOLI_1$ and in the vicinity thereof, the development of this spiral being in a plane that is parallel to the recording carrier. This is known as a spiral having a flat development parallel to the recording medium.

Each of the turns of the coil is surrounded on the inside by a non-magnetic material $AMAGI_1$. It is separated from its neighbor by a spacer of non-magnetic, electrically insulating material. Thus the coil $BOBI_1$ shown in FIGS. 4, 5 and 6 includes spacers $SPI_1$, $SPI_2$, $SPI_9$, $SPI_{10}$. These spacers are of aluminum, by way of example. The manner in which these spacers are made will be explained below in the description devoted to the manufacturing process for the transducer according to the invention.

Figure 7:
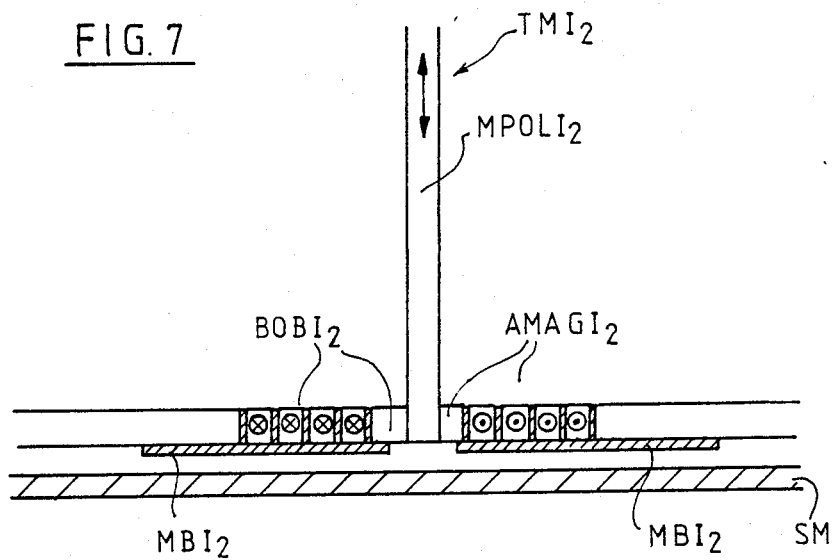
FIG. 7 is a sectional view taken in a plane that is perpendicular to the carrier and parallel to the direction of data travel, showing a second exemplary embodiment of the transducer according to the invention.

To further reduce the noise signal B, the transducer according to the invention can be provided with shielding means $MBI_2$ disposed about the monopole (FIGS. 7 and 8). The result is the transducer $TMI_2$, including the monopole $MPOLI_2$ and the coil $BOBI_2$. The various turns of the coil are provided in an insulating and non-magnetic material $AMAGI_2$ and are separated by spacers identical to those shown in FIG. 4.

Likewise, the monopole $MPOLI_2$ and the coil $BOBI_2$ are similar to the elements $MPOLI_1$ and $BOBI_1$ of the transducer $TMI_1$. The shielding means $MBI_2$ are disposed between the coil $BOBI_2$ and the carrier SM and cover virtually all the surface of the coil $BOBI_2$, such that they are disposed facing both the cells surrounding the cell $D_i$ on the track $TR_i$ and a portion of the tracks $TR_{i+1}$ and $TR_{i-1}$. These shielding means are separated from the coil $BOBI_2$ by a non-magnetic film such as to substantially reduce the magnetic coupling of the shielding means and the coil. (This non-magnetic film is not shown, in order to simplify FIG. 7.)

These shielding means $MBI_2$ are embodied as thin films and are preferably of anisotropic magnetic material, similar to that described in European Patent No. 0 040 994, filed on Mar. 20, 1981 by the Compagnie Internationale pour l'Informatique CII Honeywell Bull, under the title "Transducteur magnetique a entrefer de grande dimension variable pour la lecture ou l'ecriture des information d'un support magnetique" ["Magnetic Transducer with Large Variable-Dimension Air Gap for Reading or Writing Data on a Magnetic Carrier"].

In both the transducers $TMI_1$ and $TMI_2$, the different turns of the coils $BOBI_1$ and $BOBI_2$ are connected in series.

Figure 9:
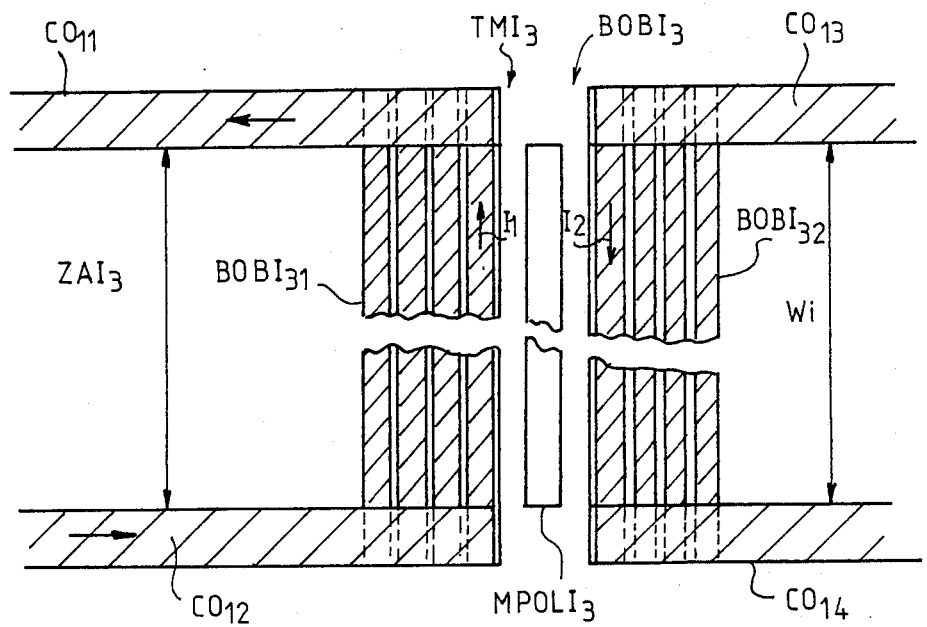
FIG. 9 shows a third exemplary embodiment of the transducer according to the invention.

FIG. 9 is a plan view of an embodiment of a transducer $TMI_3$ having a monopole $MPOLI_3$ (analogous to $MPOLI_1$ and $MPOLI_2$) and a coil $BOBI_3$, where the different turns are interconnected in parallel. Differing from the transducer $TMI_2$, there are no lateral parts such as $ZLI_1$ and $ZLI_2$. Only the central portion $ZAI_3$ remains.

The coil $BOBI_3$ is subdivided into two coil halves $BOBI_{31}$ and $BOBI_{32}$, the coil $BOBI_{31}$ occupying the portion located on the left of the monopole $MPOLI_3$ and the coil $BOBI_{32}$ located on the right-hand portion.

The four turns of the coil half $BOBI_{31}$ are connected in parallel to conductors $CO_{11}$ and $CO_{12}$, respectively, which are located respectively above and below this half coil, while the four turns of the coil half $BOBI_{32}$ are located in parallel to the conductors $CO_{13}$ and $CO_{14}$ located respectively above and below this coil half.

The currents $I_1$ and $I_2$ circulating in the turns of each of the coil halves $BOBI_{31}$ and $BOBI_{32}$ respectively, are substantially identical in absolute value but in opposite directions, both for reading and writing (such that in writing, the fields produced by each of the two coil halves are added togetner, rather than cancelling each other out). It is obvious that for reading, the two currents $I_1$ and $I_2$ can be added in an appropriate manner by reading circuits of the disk memory containing the transducer $TMI_3$.

Turning now to FIG. 10, the various steps in the process of manufacturing a transducer according to the invention, such as the transducer $TMI_1$ or $TMI_2$, are shown. The different steps of this process are as follows:

The process includes two main phases, that is, a phase $P_1$ relating to the manufacture of the monopole, and a phase $P_2$ relating to the manufacture of the coil.

Figure 10A:
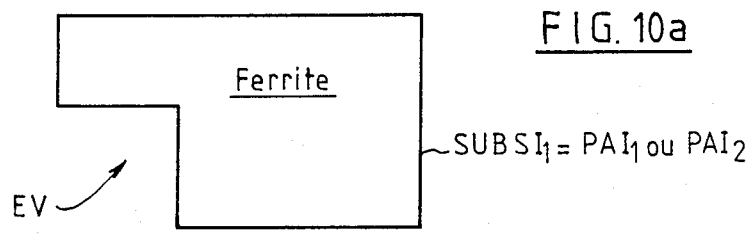
FIGS. 10a–h illustrates the various steps in the process of manufacturing a transducer according to the invention.

Phase $P_1$ includes the following steps:

Step $P_{1.1}$ (FIG. 10a). An electrically insulating substrate, of ferrite for example, which will comprise the auxiliary pole ($PAI_1$, $PAI_2$) of the transducer according to the invention, is made. This substrate is labelled SUBSI. It takes the shape of a reverse L, having a recess EV in its left-hand interior portion.

Figure 10B:
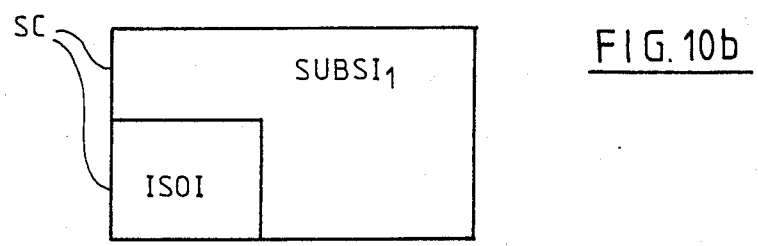

Step $P_{1.2}$. An insulating material ISOI is deposited on the ferrite substrate $SUBSI_1$, 1 to 3 microns in thickness, on the inside of the recess EV. This insulator ISOI is a non-magnetic and electrically insulating material. The assembly formed by $SUBSI_1$ and $ISOI_1$ has a lateral vertical surface area SC on the left which makes it flat, which is attained by lapping, for example (FIG. 10b).

Figure 10C:
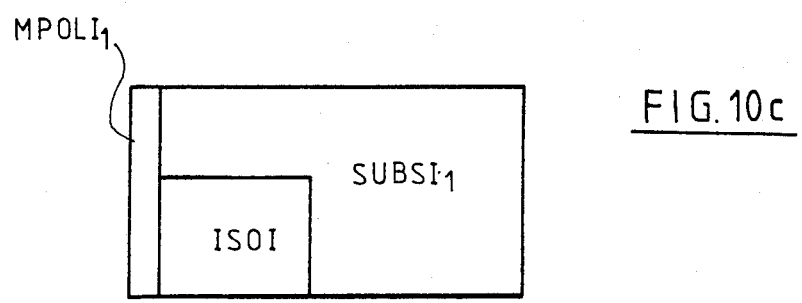

Step $P_{1.3}$. A magnetic material is deposited over the entire surface SC having the height of the substrate $SUBSI_1$ and a thickness of approximately 1 micron, substantially in the form of a parallelepiped rectangle which comprises the monopole $MPOLI_1$, for example (FIG. 10c).

Figure 10D:
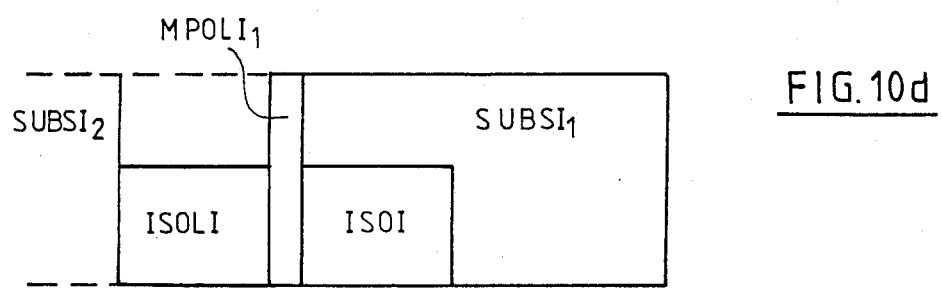

Step $P_{1.4}$. An insulator ISOLO is made, symmetrical with ISOI with respect to the monopole $MPOLI_1$ (a substrate $SUBSI_2$ could also be deposited in addition to ISOLI, symmetrical with $SUBSI_2$ and also made of ferrite, which makes it possible to make a transducer of the coaxial type with a double magnetic circuit), by an assembly operation that is better known by the English word "packaging", as it is presently used in semiconductor terminology (FIG. 10d).

Step $P_{1.5}$. The surfaces of the insulators (ISOLI, ISOI) and of the end of the monopole ($MPOLI_1$) are planarised (that is, made flat).

Phase $P_2$ includes the following steps:

Step $P_{2.1}$. First, spacers $SPI_1$–$SPI_{10}$ are made of aluminum, using the technique described for example by D. C. Flanders in the journal, Vacuum Science Technology, B1(4), October–December 1983, page 0734 -211X/83/O.

Figure 10E:
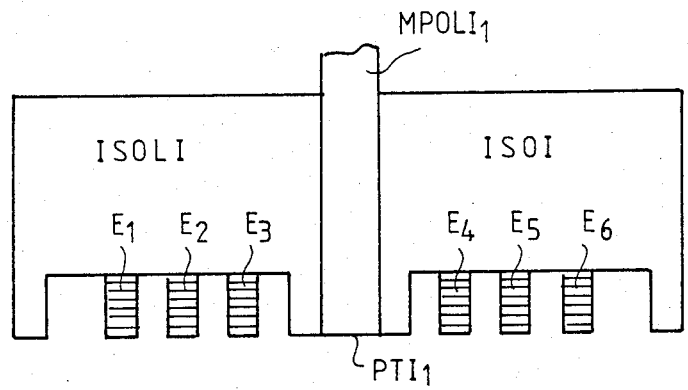
Figure 10F:
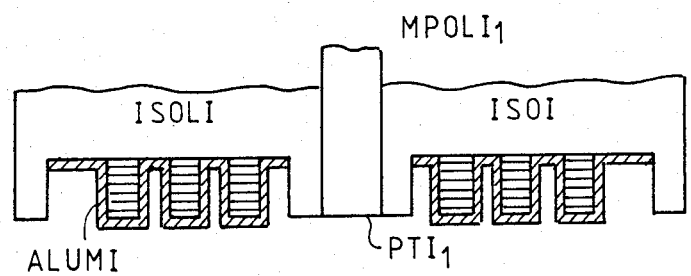
Figure 10G:
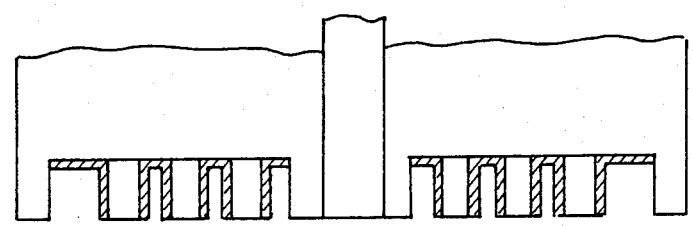
Figure 10H:
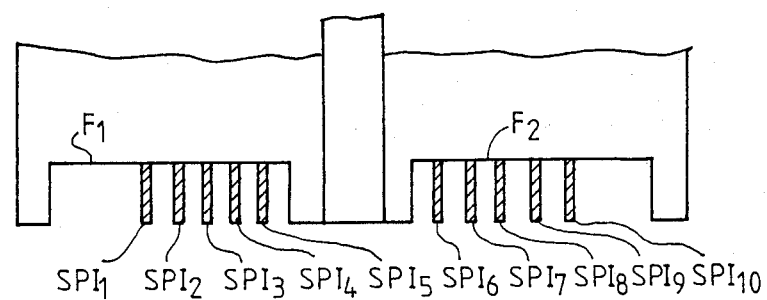

This phase $P_{2.1}$ is subdivided as follows:

(a) elements, for example six of them labelled $E_1$–$E_6$, are made from silicon dioxide $SIO_2$ by photolithography and etching in the interior of the insulators ISOLI and ISOI as shown in FIG. 10e;

(b) a thin layer of aluminum (which is an insulator and non-magnetic) ALUMI having the desired thickness for the spacers is deposited over the entire surface of the elements $E_1$–$E_6$ (FIG. 10f);

(c) by ionic etching or plasma, for example, the lower portion (see FIG. 10h) of the aluminum film ALUMI located in the plane of the end $PTI_1$ of the monopole $MPOLI_1$ is removed (see FIG. 10h);

(d) the elements $E_1$–$E_6$ are removed by selective etching as are the portions of the film ALUMI that are parallel to the end $PTI_1$ of the monopole $MPOLI_1$.

Step $P_{2.2}$. The various turns of the coil are made by accretion of a conductive film disposed between the spacers, the conductor material being powdered or evaporated.

Step $P_{2.3}$. Planarizing of the entire structure of the transducer $TMI_1$ thus manufactured is performed.

The various steps in manufacture in both phase $P_1$ and phase $P_2$ use semiconductor manufacturing techniques intended for very large scale integration (VSLI) semiconductors.

The coil may preferably be made of either copper, aluminum, molybdenum or tungsten.

What is claimed is:

1. A magnetic transducer for writing and reading data of a perpendicular rocording carrier comprising:
    a writing pole ($MPOLI_1$, $MPOLI_2$) of high-permeability magnetic material disposed in a perpendicular orientation to the recording carrier, and
    a coil ($BOBI_1$, $BOBI_2$) magnetically coupled to the writing pole and having a plurality of turns, a cross-section of each turn being perpendicular to the carrier, wherein said coil is in the form of a spiral developed in a plane parallel to the carrier and disposed about and in the vicinity of an end ($PIT_l$) of the writing pole ($MPOLI_l$) disposed facing the carrier to enhance the signal to noise ratio, a height b of the coil being equal to or less than a useful height $h_u$ of a useful part $P_u$ of the writing pole.

2. A transducer according to claim 1, wherein the height b is in the range between 1 and 3 microns.

3. A transducer according to claim 2, wherein a pitch of the turns of the coil is on the order of a micron.

4. A transducer according to claim 1, wherein a pitch of the turns of the coil is on the order of a micron.

5. A magnetic transducer for writing and reading data on a perpendicular recording carrier comprising:
    a writing pole ($MPOLI_1$, $MPOLI_2$) of high permeability magnetic material disposed in a perpendicular orientation to the recording carrier, and
    a coil ($BOBI_1$, $BOBI_2$) magnetically coupled to the writing pole and having a plurality of turns, a cross-section of each turn being perpendicular to the carrier, wherein said coil is in the form of a spiral developed in a plane parallel to the carrier and disposed about and in the vicinity of an end ($PIT_1$) of the writing pole ($MPOLI_l$) disposed facing the carrier to enhance the signal to noise ratio, a height b of the coil being equal to or less than a useful height $h_u$ of a useful part $p_u$ of the writing pole; and wherein the writing pole has a width and a thickness, said width taken to be prependicular to a direction of data travel of said carrier relative to said transducer, said thickness taken to be parallel to said direction of data travel, and wherein the coil comprises an active central zone (ZAI) and two lateral parts ($ZLI_1$ and $ZLI_2$), the active central zone being disposed on both sides of the writing pole in a direction of the thickness of said pole, the two lateral parts being disposed on both sides of the writing pole in a direction of the width of said pole; wherein the cross-section of the turns of said coil in the active central zone is less than the cross-section of the turns of said coil in the lateral parts, and wherein a density of the turns of said coil in the active central zone is greater than a density of the turns of said coil in the lateral parts.

6. A transducer according to claim 5, wherein the height b is in the range between 1 and 3 microns.

7. A transducer according to claim 6, wherein a pitch of the turns of the coil is on the order of a micron.

8. A transducer according to claim 7, further including shielding means ($MBI_2$) for shielding at least a portion of the coil from the, said shielding means covering a lower surface of the coil and disposed about the writing pole ($MPOLI_2$) between the coil and the recording carrier (SM).

9. A transducer according to claim 6, further including shielding means ($MBI_2$) for shielding at least a portion of the coil from the carrier, said shielding means covering a lower surface of the coil and disposed about the writing pole ($MPOLI_2$) between the coil and the recording carrier (SM).

10. A transducer according to claim 5, wherein a pitch of the turns of the coil is on the order of a micron.

11. A transducer according to claim 10, further including shielding means ($MBI_2$) for shielding at least a portion of the coil from the carrier, said shielding means covering a lower surface of the coil and disposed about the writing pole ($MPOLI_2$) between the coil and the recording carrier (SM).

12. A transducer according to claim 5, further including shielding means ($MBI_2$) for shielding as least a portion of the coil from the carrier, said shielding meand covering a lower surface of the coil and disposed about the writing pole (MPOLI$_2$) between the coil and the recording carrier (SM).

13. A magnetic transducer for writing and reading data on a perpendicular recording carrier comprising:
   a writing pole (MPOLI$_1$, MPOLI$_2$) of high-permeability magnetic material disposed in a perpendicular orientation to the recording carrier, and
   a coil magnetically coupled to the writing pole and having a plurality of turns, a cross-section of each turn being perpendicular to the carrier, wherein said coil is in the form of a spiral developed in a plane parallel to the carrier and disposed about and in the vicinity of an end (PIT$_1$) of the writing pole (MPOLI$_1$) disposed facing the carrier to enhance the signal to noise ratio, a height b of the coil being equal to or less than a useful height $h_u$ of a useful part $p_u$ of the writing pole; and wherein the coil (BOBI$_3$) includes two separate coil halves (BOBI$_{31}$ and BOBI$_{32}$) disposed on a first and a second side of the writing pole, which comprises a monopole (MPOLI$_3$), the turns of said coil halves being electrically connected in parallel.

14. A transducer according to claim 13, wherein a pitch of the turns of the coil is on the order of the micron.

15. A transducer according to claim 14, further including shielding means (MBI$_2$) for shielding at least a portion of the coil from the carrier, said shielding means covering a lower surface of the coil and disposed about the writing pole (MPOLI$_2$) between the coil and the recording carrier (SM).

16. A transducer according to claim 13, further including shielding means (MBI$_2$) for shielding at least a portion of the coil from the carrier, said shielding means covering a lower surface of the coil and disposed about the writing pole (MPOLI$_2$) between the coil and the recording carrier (SM).

17. A magnetic transducer for writing and reading data on a perpendicular recording carrier comprising:
   a writing pole (MPOLI$_1$, MPOLI$_2$) of high-permeability magnetic material disposed in a perpendicular orientation to the recording carrier, and
   a coil (BOBI$_1$, BOBI$_2$) magnetically coupled to the writing pole and having a plurality of turns, a cross-section of each turn being perpendicular to the carrier, wherein said coil is in the form of a spiral developed in a plane parallel to the carrier and disposed about and in the vicinity of an end (PIT$_1$) of the writing pole (MPOLI$_1$) disposed facing the carrier to enhance the signal to noise ratio, a height b of the coil being equal to or less than a useful height $h_u$ of a useful part $p_u$ of the writing pole; and further including shielding means (MBI$_2$) for shielding at least a portion of the coil from the carrier, said shielding means covering a lower surface of the coil and disposed about the writing pole (MPOLI$_2$) between the coil and the recording carrier (SM).

18. A transducer according to claim 17 wherein the height b is in the range between 1 and 3 microns.

19. A transducer according to claim 17 wherein a pitch of the turns of the coil is on the order of 1 micron.

20. A transducer according to claim 19 wherein the height b is in the range between 1 and 3 microns.

21. A magnetic transducer for writing and reading data on a perpendicular recording carrier comprising:
   a writing pole (MPOLI$_1$, MPOLI$_2$) of high-permeability magnetic material disposed in a perpendicular orientation to the recording carrier; and
   a coil (BOBI$_1$, BOBI$_2$) magnetically coupled to the writing pole and having a plurality of turns, a cross-section of each turn being perpendicular to the carrier, wherein said coil is in the form of a spiral developed in a plane parallel to the carrier and disposed about and in the vicinity of an end (PIT$_1$) of the writing pole (MPOLI$_1$) disposed facing the carrier to enhance the signal to noise ratio; and shielding means (MBI$_2$) for shielding at least a portion of the coil from the carrier, said shielding means covering a lower surface of the coil and disposed about the writing pole (MPOLI$_2$) between the coil and the recording carrier (SM).

* * * * *

UNITED STATES PATENT AND TRADEMARK OFFICE
CERTIFICATE OF CORRECTION

PATENT NO. : 4,771,350
DATED : September 13, 1988
INVENTOR(S) : Jacques DESSERRE It is certified that error appears in the above-identified patent and that said Letters Patent is hereby corrected as shown below:

Claim 1, line 56, "of" should be --on--.

Claim 1, line 66, "($PIT_2$)" should be --($PIT_1$)--.

Claim 1, line 66, "($MPOLI$)" should be --($MPOLI_1$)--.

Claim 5, line 20, "($MPOLI$)" should be --($MPOLI_1$)--.

Claim 12, line 66, "as" should be --at--.

Claim 12, line 67, "meand" should be --means--.

Signed and Sealed this

Thirty-first Day of October, 1989

Attest:

DONALD J. QUIGG

Attesting Officer

Commissioner of Patents and Trademarks